United States Patent Office 3,323,748
Patented June 6, 1967

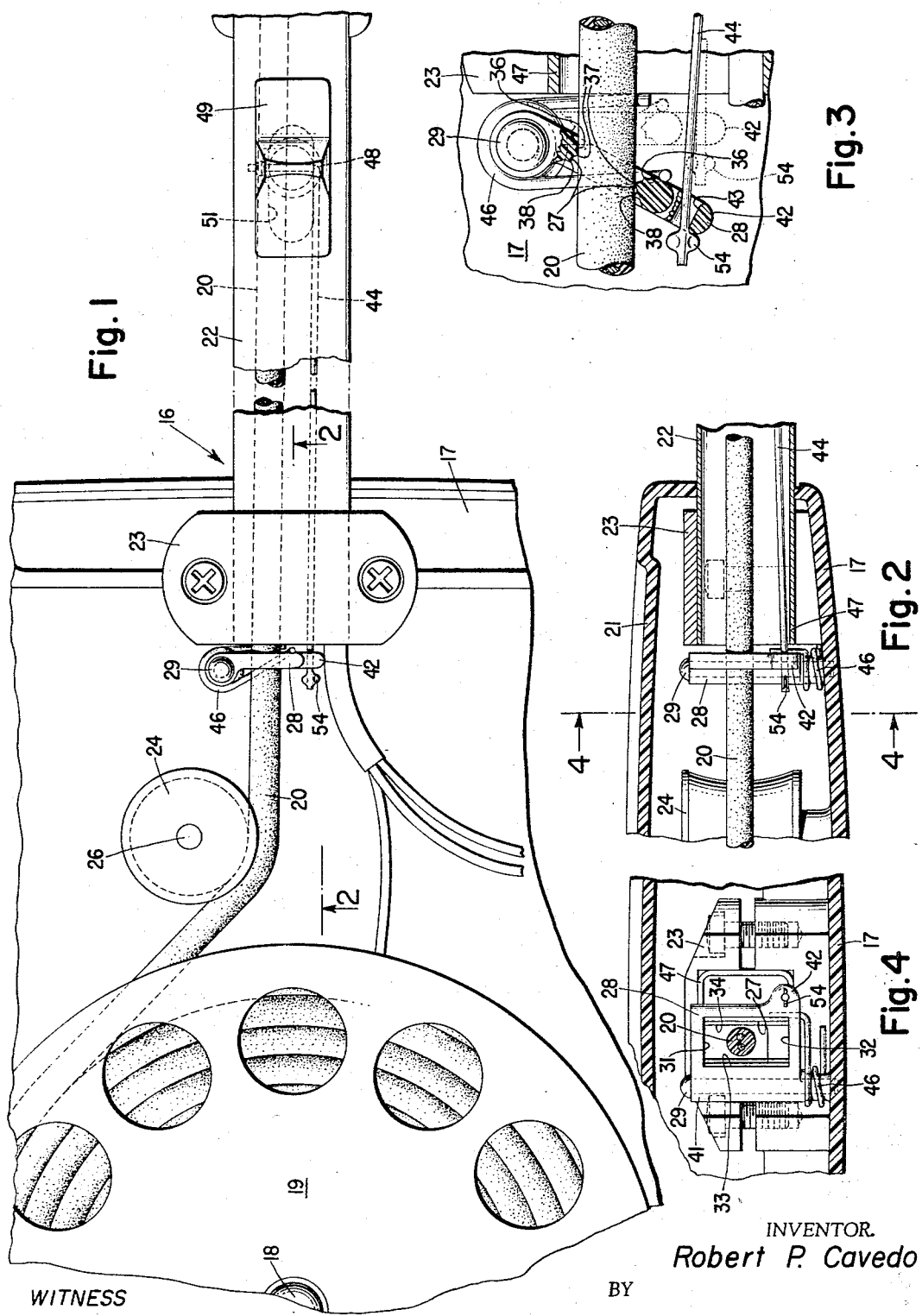

3,323,748
CORD CONTROL MECHANISM FOR VACUUM CLEANERS
Robert P. Cavedo, Anderson, S.C., assignor to The Singer Company, New York, N.Y., a corporation of New Jersey
Filed Oct. 1, 1965, Ser. No. 492,093
4 Claims. (Cl. 242—107.2)

ABSTRACT OF THE DISCLOSURE

This disclosure relates to means for controlling the movement of an electric extension cord as it is unwound from and retrieved by a spring biased cord reel, and more particularly relates to a mechanism, especially adapted for use with an electrical appliance such as a vacuum cleaner, for stopping, gripping and releasing the cord.

Objects of the invention

It is a primary object of this invention to provide an improved device for controlling the movement of an electric extension cord as it is unwound from and retrieved by a spring biased cord reel.

Another object of the invention is to provide an improved cord control mechanism that can be manufactured inexpensively and also easily applied to the propelling handle of a vacuum cleaner.

A further object of the invention is to provide a cord control mechanism having an apertured cord-stop, of which the opposite sides of the aperture are formed with advantageous cord gripping surfaces.

With the above and other objects in view, as will hereinafter appear, the invention comprises the devices, combinations and arrangements of parts hereinafter set forth and illustrated in the accompanying drawings of a preferred embodiment of the invention from which the several features of the invention and the advantages attained thereby will be readily understood by those skilled in the art.

Brief description of the drawings

In the drawings:

FIG. 1 is a plan view of a vacuum cleaner handle equipped with my improved cord control mechanism, the handle stem being shown as shortened by omitting a middle portion thereof, and a cover of a portion of the handle having been removed, FIG. 2 is a fragmentary sectional view taken substantially on the line 2—2 of FIG. 1, FIG. 3 is an enlarged fragmentary view, partly in section, and showing a different position of some of the parts shown in FIG. 1, and FIG. 4 is a fragmentary view taken substantially on the line 4—4 of FIG. 2.

Description of the preferred embodiment

The vacuum cleaner, of which the subject cord control mechanism forms a part, includes a chassis (not shown) which may be moved back and forth over a rug or carpet being cleaned by a propelling handle 16 pivotally mounted (in a manner not shown) on the chassis. The handle 16 includes a cord reel housing base 17, which may be similar to the cord reel housing base shown in the United States Patent No. 2,622,706, and the housing by means of an axle 18 rotatably mounts a cord reel 19 from which an electric extension cord 20 may be unwound or retrieved in a well known manner. When the vacuum cleaner is in use the reel housing base 17 is topped by a cover 21 (FIG. 2). The lower end of a single handle tube 22 is secured to an upper portion of the housing 17 by means of a screw-held plate clamp 23. The cord 20, as it leaves or is retrieved by the reel 19, passes over a roller 24 rotatably mounted on a pivot pin 26 secured to the housing base 17. From thence the cord extends through an aperture 27 in a cord-stop 28 which by means of a pivot pin 29 is turnably mounted on the base 17. Then the cord 20 passes through the tube 22 and through an exit passageway (not shown). It will be understood that the free end of the cord will be equipped with a conventional electric plug (not shown).

The cord-stop 28 is substantially in the form of a rectangular plate (FIG. 4) having the previously mentioned aperture 27, this aperture 27 is preferably rectangular in shape and has two short sides 31 and 32 and two long sides 33 and 34. Both of the sides 33 and 34 are knurled, in that each side has three longitudinally extending triangular shaped projections which provide (FIG. 3) three longitudinally extending sharp edges 36, 37 and 38, and these sharp edges 36, 37 and 38 are positioned so as to define two semicylinders, the convex surfaces of which face each other from opposite sides of the aperture 27. One side of the cord-stop 28 has a longitudinally extending hub 41 and this hub 41 is apertured to accommodate the previously mentioned pivot pin 29. The other side of the cord-stop 28 is formed with a lateral projection 42, which is formed with an aperture 43 designed to accommodate a headed control wire 44. The cord-stop 28 is biased by a coiled spring 46 so as to turn in a clockwise direction (FIG. 3). One end of the spring 46 engages the end 47 of the tube 22 and the other end of the spring 46 engages one face of the cord-stop 28. The control wire 44 extends upwardly through the handle tube 22, is bent at 48 and is thereby connected to a portion of a control button 49 which extends through a hole 51 formed in the tube 22. The other end of the wire 44 is headed as at 54 and thereby is prevented from being pulled through the aperture 43. In other words the head 54 connects one end of the wire 44 to the cord-stop 28.

In operation, the cord control mechanism functions in the following manner. Under normal circumstances, the cord-stop 28 is biased in a clockwise direction to grip the cord 20 in the manner shown in solid lines in FIG. 3. In this instance the cord reel 19 is attempting to retrieve the cord but is prevented from doing so because of the cord being gripped by the knurled (36, 37 and 38) sides of the cord-stop 28. If the operator of the vacuum cleaner wishes to have the cord 20 retrieved by the reel 19, she moves the control button 49 to the right as seen in FIG. 1. This moves the control wire 44 and turns the cord-stop 28 in a counterclockwise direction (against the bias of the spring 46) from the solid line position shown in FIG. 3 to the dash-dash position of the FIG. 3. This releases the grip of the stop 28 on the cord 20 and allows the cord 20 to pass freely through the aperture 27. This permits the cord reel 19 to retrieve the cord. Releasing the button 49 allows the spring 46 to cause the cord-stop 28 to grip the cord and thus stop the reel 19 from its retrieving action. If the operator wishes a longer length of cord to protrude from the handle tube 22 she simply pulls on the cord 20. Movement of the cord 20 away from the reel 19 causes the cord-stop 28 to turn counter-clockwise sufficiently to allow the cord-stop 28 to lose its grip on the cord 20, thus permitting the cord 20 to be drawn from the reel 19.

Having thus set forth the nature of the invention, what I claim herein is:

1. A vacuum cleaner handle and cord control mechanism comprising a reel housing, a cord reel rotatably mounted in said housing, a handle tube, means securing one end of said handle tube to said housing, an apertured cord-stop pivotally mounted on said housing, said cord-stop having walls defining a first aperture in said cord-stop, said first aperture in said cord-stop being rectangular and having as least one of said walls defining said first aperture formed with a plurality of sharp projections, the said sharp projections being positioned so as to define a plurality of semicylinders having convex surfaces on said at least one of said walls defining said first aperture, an extension cord wound on said reel and extending through said rectangular aperture in said cord-stop and through said tube, spring means biasing said cord-stop to a cord-gripping position, said cord-stop having further walls defining a second aperture, a control wire extending through said handle tube and having one end passing through said second aperture in said cord-stop, and a head on said control wire, said head connecting one end of said wire to said cord-stop.

2. A vacuum cleaner handle and cord control mechanism comprising a reel housing, a cord reel rotatably mounted in said housing, a handle tube, means securing one end of said handle tube to said housing, an apertured cord-stop pivotally mounted on said housing said cord-stop having walls defining a first aperture in said cord-stop, said first aperture in said cord-stop being rectangular and having at least one of said walls defining said first aperture formed with a plurality of sharp projections, an extension cord wound on said reel and extending through said rectangular aperture in said cord-stop and through said tube, spring means biasing said cord-stop to a cord-gripping position, said cord-stop having further walls defining a second aperture, a control wire extending through said handle tube and having one end passing through said second aperture in said cord-stop, and a head on said control wire, said head connecting one end of said wire to said cord-stop.

3. A vacuum cleaner handle and cord control mechanism as defined in claim 1 wherein the wall of said first aperture opposite from said one wall also has a plurality of sharp projections formed thereon, said sharp projections on both of said walls being positioned so as to define at least two semicylinders having convex surfaces which face one another from opposing walls of said aperture.

4. A vacuum cleaner handle and cord control mechanism comprising a reel housing, a cord reel rotatably mounted in said housing, a handle tube, means securing one end of said handle tube to said housing, an apertured cord-stop mounted on said housing, said cord-stop having walls defining a first aperture in said cord-stop, said first aperture having at least one of said walls defining said first aperture formed with a plurality of sharp projections, an extension cord wound on said reel and extending through said first aperture in said cord-stop and through said tube, spring means biasing said cord-stop to a cord-gripping position, a control wire disposed adjacent said tube, a second aperture in said cord-stop, said cord-stop having further walls defining said second aperture, and said control wire having one end secured in said second aperture in said cord-stop.

References Cited

UNITED STATES PATENTS

| | | | |
|---|---|---|---|
| 1,482,268 | 1/1924 | Schopper. | |
| 2,262,429 | 11/1941 | Lucker | 254—106 |
| 2,532,264 | 11/1950 | Smith | 242—107.2 X |
| 3,156,963 | 11/1964 | Owen | 254—106 X |
| 3,178,128 | 4/1965 | Meletti | 242—107.2 |
| 3,251,107 | 5/1966 | Scott | 15—323 X |

FRANK J. COHEN, *Primary Examiner.*

W. S. BURDEN, *Examiner.*